Figures 1, 2, 10, 11:
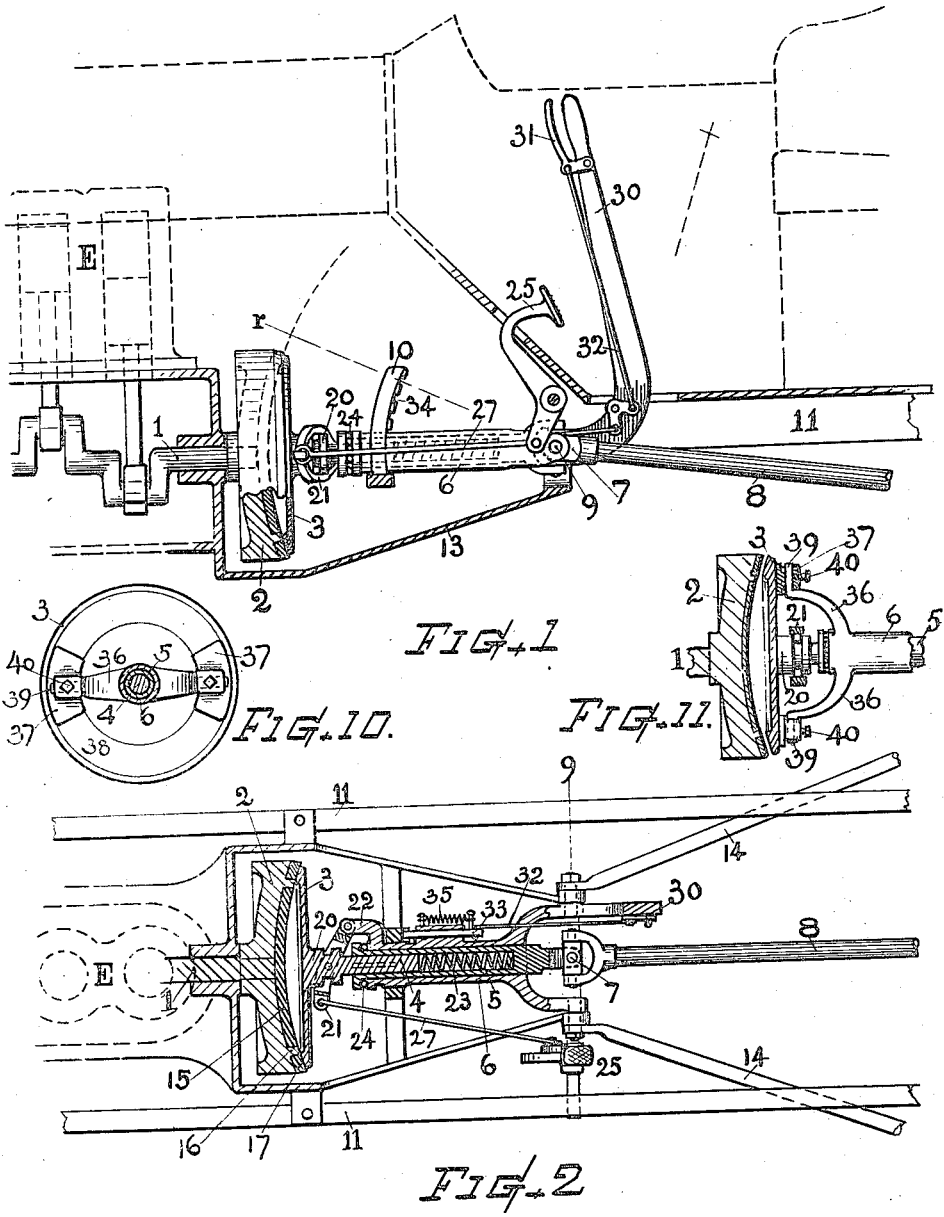

F. O. WOODLAND.
ROLLING TRANSMISSION MECHANISM.
APPLICATION FILED JUNE 17, 1913.

1,139,393.

Patented May 11, 1915.
3 SHEETS—SHEET 1.

Witnesses—
Leon M. Yatter
Harry N. Parker

Inventor—
Frank O. Woodland.
By Chas. H. Burleigh
Attorney

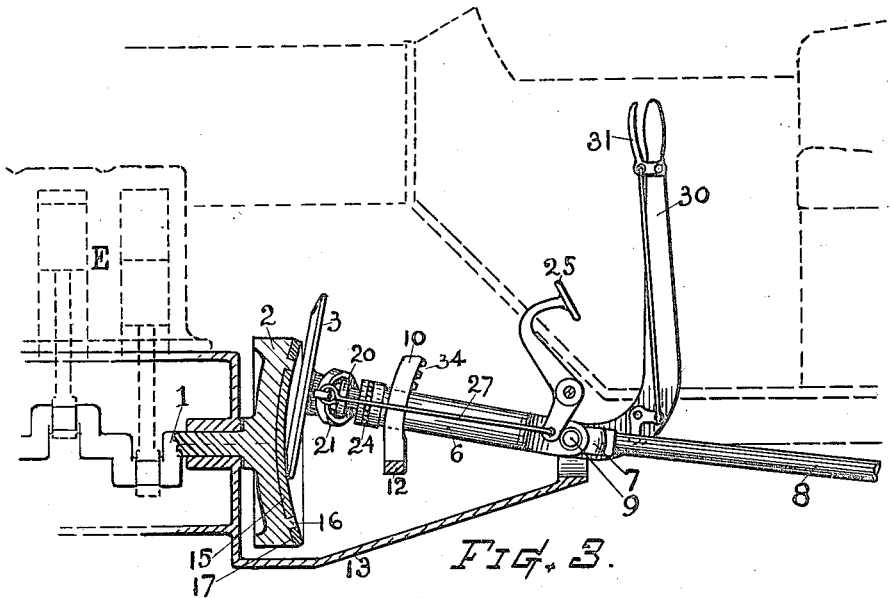
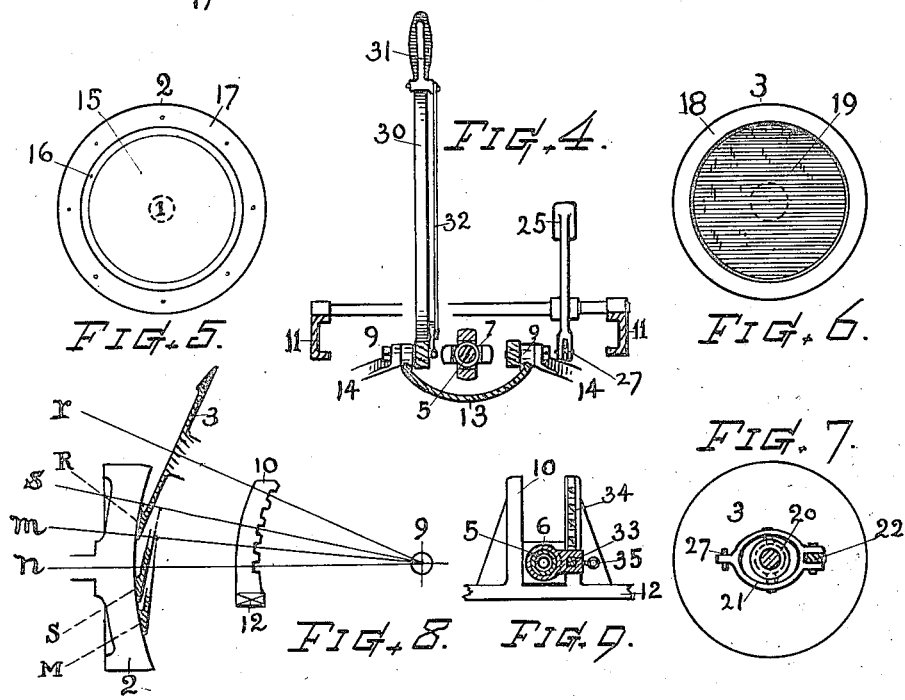

F. O. WOODLAND.
ROLLING TRANSMISSION MECHANISM.
APPLICATION FILED JUNE 17, 1913.

1,139,393.

Patented May 11, 1915.
3 SHEETS—SHEET 3.

Witnesses.

Inventor.
Frank O. Woodland

UNITED STATES PATENT OFFICE.

FRANK O. WOODLAND, OF WORCESTER, MASSACHUSETTS.

ROLLING TRANSMISSION MECHANISM.

1,139,393.  Specification of Letters Patent.  Patented May 11, 1915.

Application filed June 17, 1913. Serial No. 774,227.

*To all whom it may concern:*

Be it known that I, FRANK O. WOODLAND, a citizen of the United States, residing at Worcester, in the county of Worcester and State of Massachusetts, have invented a new and useful Rolling Transmission Mechanism, of which the following is a specification, reference being made therein to the accompanying drawings.

One object of my present invention is to provide a simple, efficient and economical mechanism for the transmission and speed control of power and motion from a motor engine shaft to the operated parts; said mechanism being more especially adapted for light weight automobiles and for similar motor purposes.

Another object is to provide a rolling clutch transmission means of novel construction and combination, adapted for giving forward or reverse action by simple adjustment, and for effecting a direct friction clutch transmission mechanism when at normal speed position. Also to provide a transmission and speed controlling mechanism affording ample variety of speed changes and easy and convenient means for shifting from one to another speed.

These objects I attain by mechanism the nature, construction and mode of operation of which is illustrated in the drawings and hereinafter explained; the particular subject matter claimed being definitely expressed in the summary.

Figure 12:
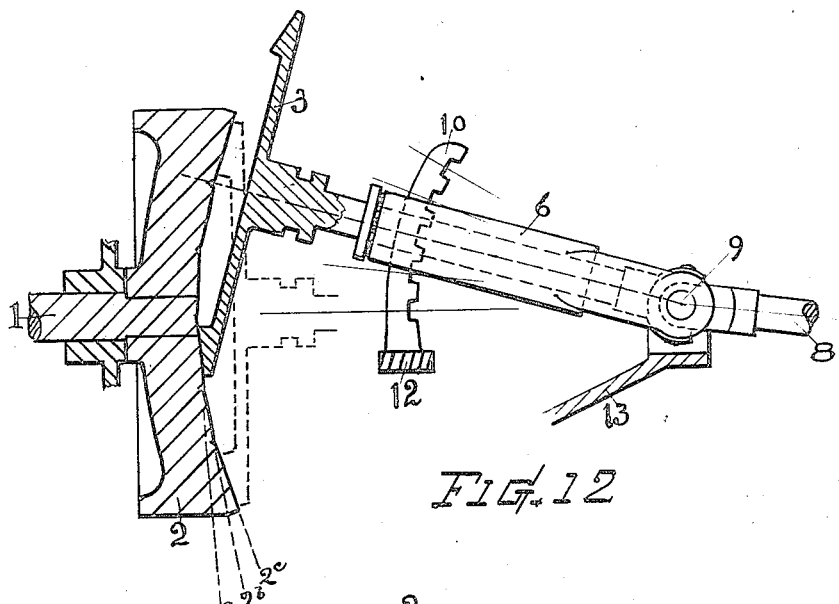
Figure 13:
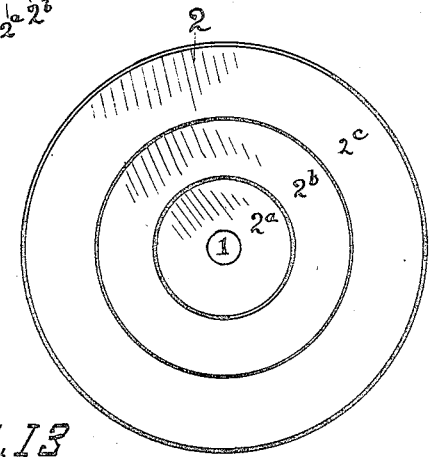

In the drawings, (2 sheets) Figure 1 represents a side elevation view of a transmission mechanism embodying my invention, and with the parts adjusted for action as a direct friction clutch. Fig. 2 is a horizontal sectional view of the same. Fig. 3 is a part side part section view showing the mechanism as at a position of adjustment for attaining reduced speed, and acting as a rolling contact. Fig. 4 represents a transverse vertical section at a position just forward of the fulcrum axis and looking rearward. Fig. 5 represents the face of the drive-disk, and Fig. 6 the face of the driven disk. Fig. 7 is a back view of the driven disk and clutch shifting collar. Fig. 8 is a diagrammatic view indicating the speed change positions of the tilting shaft and clutch members. Fig. 9 is a transverse sectional detail view showing the transmission shaft, its tubular bearing sleeve and the guiding housing therefor. Figs. 10 and 11 illustrate a simple brake mechanism combined with the shiftable bearing-sleeve and variable contact friction clutch member, having its axis carried therein. Fig. 12 is a sectional view, on somewhat larger scale, illustrating a modification, wherein the face of the driving clutch member made as series of conical zones, approximating a spherical contour, instead of a true or continued spherical surface, and Fig. 13 represents the face view of the driving clutch member as formed with conical zones.

In Figs. 1, 2 and 3 portions of a motor car are outlined for indicating the relative position of my improved mechanism in respect to the engine and body of the car.

Referring to the drawings, the numeral 1 indicates the power-shaft, or crank-shaft of a motor engine at E; which engine may be of any approved type or kind suitable for employment in a motor vehicle, or for rotating said shaft together with the drive-disk or frictional member 2 that is mounted upon or connected for rotation with said motor-shaft.

3 indicates the power-receiving disk or frictional member having a projecting axle or spindle 4 that is supported within a hollow shaft 5 which extends through a tubular bearing-sleeve 6, and has its rear end coupled, by a universal joint 7, to the fore end of the propeller shaft 8; which latter shaft, as will be readily understood operates, in usual manner, the driving-axle and wheels (not shown) of the automobile, motor vehicle, or machine on which my invention is employed, through any suitable combination of gearing which, being well known, it is unnecessary to describe herein.

The bearing sleeve 6 is bifurcated at its rear end, or provided with arms which are pivotally connected with a support, as at 9, on a transverse axial line at right angles with the shaft axis and at a position coinciding with the center of the universal joint 7, and in a plane coincident with the axis of the hollow shaft 5; also in a plane coincident with the axial line of the motor-shaft 1. The body portion of said bearing sleeve is arranged between upright housings or guides 10 so as to swing up and down in a vertical plane coincident with the central alinement of the shafts 1 and 5.

The guiding housing is best supported upon a transverse bar 12 fixed to the under casing 13; the latter being a portion of the engine-supporting frame, and extending beneath the transmission mechanism approximately as shown; its rear end being provided with ears or bosses for supporting the hinging pivots 9 of the bearing-sleeve, and for connection of the brace-rods or bars 14 that are respectively rigidly connected at their rear ends (not shown) with the rear axle of the motor-vehicle in any suitable well known manner. The under casing and engine frame are best made integral, and provided with lateral projections or ears that rest upon and are secured to the chassis or side bars 11 of the vehicle. The engine E may also be supported in similar manner at its front end, making three points of suspension therefor.

The disk 2, which constitutes the first member of the transmission clutch, is formed with a spherically concave, or approximately spherically concave, frictional face, having a contour represented by the uniform arc of a circle turned from the point where the hinging line intersects the axis of the bearing sleeve as a center. The face of said disk member is preferably provided with a central frictional surfacing 15 (see Fig. 5) of paper or fiber material, held within a small integral rim or flange 16 formed on the disk, and is also furnished with a facing 17 outside said rim flange made of "raybestos" or other frictional material, secured to the disk by rivets, screws or equivalent fastening devices. The working surfaces of all these facing materials are preferably flush with each other and conformed to the concave contour of the character stated. The contour of the frictional faces of the clutch member may be made either as a true spherical segment, or as a series of narrow conical zones disposed in an order to approximate the spherical form, as $2^a$, $2^b$, $2^c$; the width of the zones being approximately such as will accommodate the width of the annular face of the driven clutch member.

The disk 3, or second member of the clutch, is made with an annular frictional surface 18 (see Fig. 6) having a convex contour that approximately matches the concave curvature or zone facets of the disk 2. The central area 19 of the disk 3 is recessed or formed so as not to contact with the disk 2. The hub 20 at the back of the disk 3 is provided with a circumferential groove or flange for engagement with a shifting lever or collar 21. The projecting stem or axle of the disk telescopes into the end of the hollow shaft 5, and is fitted thereto with a spline, so that while said axle can have endwise telescoping action, the disk and hollow shaft must rotate together. Within the hollow of the shaft, which does not extend entirely through its length, there is arranged a strong expanding tensioned spring 23 that acts against the end of the axle to force the disk 3 forward for closing together the frictional contact surfaces of the members 2 and 3. A ball-bearing collar 24 is preferably arranged at the end of the sleeve to take the endwise thrust of the hollow-shaft against the end of said bearing-sleeve. The arm 22 that carries the fulcrum pivot of the shifting collar 21, is attached to the forward portion of the bearing sleeve. A pedal lever 25, arranged at convenient location for the operator, is connected by a rod 27 with the swinging end of the shifting collar 21, whereby pressure on the pedal releases the clutch. The arrangement of the lower pedal arm is preferably such that when depressed the pivot connecting the rod and arm comes into approximate coincident alinement with the hinging axis of the tubular bearing-sleeve.

A handle-lever 30 is suitably connected with the bearing-sleeve 6, for swinging the forward end of said sleeve, together with the parts carried thereby, up and down in a vertical plane coincident with the central axis of the shaft; the swing of the shaft 5 being partly below and partly above the direct line of the propeller shaft 8. The handle lever 30, as herein shown, is preferably made integral with, and as an extension upon one of the arms forming the hinging end of the bearing-sleeve; and a latch-actuating grip 31 is combined therewith which connects by suitable rods 32 and an angle lever with a latching bolt or device 33 that engages with any one of a series of lugs or notches 34 of a notched segment formed upon or attached to the guide-housing 10. Said latch-bolt is adapted for retaining the bearing sleeve at various positions of adjustment, as illustrated. A spring 35 is provided for pressing the latch bolt forward.

In accordance with my invention a simple brake mechanism may be combined with the swinging bearing-sleeve 6, and adapted for contact with an annular surface upon the back of the driven clutch member 3. In the construction shown in Figs. 10 and 11, the sleeve 6 is provided with forwardly projecting arms 36 at its forward end; the extremity of each of said arms being furnished with a stationary brake-shoe or bearer 37 against which the body of the clutch-disk 3 is brought into contact by a full retractive movement when the clutch faces are thrown out of contact by the agency of the pedal 25, the movement being the same but slightly extended. The disk is best provided with a suitable annular surface 38 for the brake contact.

For rendering the brake-shoes conveniently removable the arms 36 are preferably formed with laterally or outwardly projecting pins or studs 39, and the brake-shoe is provided with an ear or socket that readily slips onto said pin or stud, and is retained at adjusted position thereon by a set-screw 40, or other conveniently releasable fastening device. This construction permits ready change of brake members 37 without disturbing any other part of the mechanism, and also affords a brake means that accompanies the oblique shift of the clutch member when changing speeds.

In the operation: the operator, by pressing his foot upon the pedal 25, overcomes the pressure of the spring 23 and draws back the disk 3 from contact with the disk 2. Then by his hand upon the lever 30 he swings the shaft 5 and disk 3 up or down as my be desired, to bring the disk 3 into tilted relation in respect to the face of the driving disk or member 2, as shown in Fig. 3, or its axis to positions indicated by lines $n$, $m$, $s$, $r$ on Fig. 8. When the axis of the driven member or disk 3 is in straight alinement with the motor-shaft 1 and disk 2, as shown in Figs. 1 and 2, and as indicated by line $n$ on Fig. 8, the two contact members 2 and 3 normally match together about the full circle of the annular face and then act as a direct friction-clutch, transmitting to the propeller-shaft 8 power and motion at the same speed of rotation as that of the motor-shaft 1; or approximately so, lessened only by permitted slip of the frictional clutch surfaces.

When the driven member 3 is adjusted to a tilted position, as shown in Fig. 3, then the contact of the friction surfaces becomes changed from a direct friction grip to a rolling contact; the disk-member 3 rolling upon the face of the disk-member 2, for transmission of motion to the propeller shaft 8 which then rotates at a speed less than that of the motor-shaft 1. The relative speed ratio varies as the contacting point of the friction member 3 is nearer to or farther from the axis of the driving disk. Thus when the axis of the disk is at line $m$, (see Fig. 8) the rolling contact occurs at a position approximately at M, and a medium speed of the driven member is attained. Likewise with the axial adjustment at line $s$, the rolling contact is yet nearer the center of the disk, as at S, and a slow speed of the driven members is effected. By a further tilting or adjustment of the axis to the position indicated by $r$, the point of rolling contact becomes transferred to the opposite side of the axis of the driving disk, as at R, and a reversal of the direction of rotation of the driven members and propeller shaft results.

It may be observed that the range of variations of speed is not limited to the positions of the axial lines herein delineated for the purpose of illustration; since the friction contact may be at any place between the straight axis alinement $n$ and the reversed position $r$; but the stations indicated by said lines $n$, $m$, $s$, $r$ render it convenient to employ a notched segment and bolt for holding the parts at positions of adjustment instead of some unnotched holding device which might in some cases be employed if desired. By applying sufficient force upon the pedal the back of the disk 3 is pressed against the brake-shoes 37 and its motion thereby checked or retarded.

It will be noticed that the angularity between the shaft 5 and the propeller shaft 8 never becomes excessive. As the disk 3 is elevated these shafts approach nearer to a straight common alinement until they assume an opposite angularity, and when at position for reverse motion their relative angularity is at about the same degree above a straight line, as it was below such line when the disk is at its lowest point of adjustment. This feature is of importance, since it results in a smoother running action and an easier control in shifting from one speed to another. It may also be observed that by pressing upon the pedal at any time, at whatever relative position the friction disks are adjusted, the clutch is instantly released.

When the machine is running forward, by shifting the clutch from the position for forward action to the position for reverse action, then the clutch offers resistance against the forward motion of the engine and thereby serves as an aid for stopping the running of the car.

I claim and desire to secure by Letters Patent—

1. A variable speed transmission mechanism, including a pair of frictionally contacting clutch-members the faces of which conform approximately to a spherical segment, their shafts being arranged in normal axial alinement with each other, a motor-supporting frame having an extension provided with hinging-ears at or near its outer end, the shaft of the motor and driving clutch-member mounted upon said motor-supporting frame, a tubular bearing-member pivotally supported in said hinging ears on the motor-supporting frame, the shaft of the driven clutch-member supported in said tubular bearing-member, said bearing-member adapted to swing said driven shaft into oblique or straight relation to the motor-shaft from a point coincident with the axis of said hinging ears, the same being at the center of a circular arc representing the curvature of the frictional contact surface of the clutch-members, a propeller shaft flexibly connected to the end of said driven-shaft coincident with the hinging-axis, a hand-lever connected with said tubular bearing member for raising and depressing the driven-clutch member and its shaft from straight to oblique relation, and vice versa, adjustment-retaining means, and means for closing and releasing the clutch contact.

2. In a transmission mechanism for motor vehicles or the like, the combination with the motor shaft, and the propeller shaft, of a clutch-carrying intermediate shaft, and a frictional disk clutch mechanism forming the operative connection between said motor shaft and intermediate shaft, said intermediate shaft having flexible connection, end to end, with the propeller shaft, a horizontally hinged bearing supporter for said clutch-carrying shaft, and a controlling means connected with said bearing supporter for varying the alinement of the clutch-carrying shaft and axis of the driven clutch member in relation to the driving clutch member and motor shaft.

3. In a transmission mechanism for motor vehicles, the combination of a motor-supporting frame provided with an extension, a motor carried upon said frame, the motor-axle having thereon a driving-disk with an approximately spherically concave engaging surface, a swinging bearing-member hingedly connected at its rear end with the extended part of the motor-supporting frame, an operating-shaft carried by said swinging bearing-member, a second disk having a counter-matching engaging surface that coacts with said driving-disk and is united with said operating-shaft by endwise slidable connections, the propeller-shaft universally jointed to said operating-shaft approximately in line with the hinging of the bearing-member and motor-frame extension, yielding devices that permit limited movement of said driven-disk to and from contact with said driving-disk, actuating means for controlling said movement, means for adjusting said swinging bearing-member and parts carried thereon up and down to bring the disks into straight or inclined relation, and means for retaining the same at adjusted position.

4. In an operating mechanism for motor vehicles, the combination as described, with the motor, and the propeller shaft, of a motor supporting frame having a rearward extension forming an under casing with horizontal hinging ears at its rear end, a motor-shaft, a concaved faced driving-disk mounted upon the motor shaft, a swinging supporting member, its rear end pivotally connected with said hinging-ears upon the motor-supporting frame, an operating-shaft carried by said swinging member and its rear end jointedly connected with the propeller shaft, a power-receiving clutch-disk having an annular face for engaging with the driving-disk at varied degrees of inclination, and connected with the operator-shaft by endwise telescoping members, means for varying the inclination of said swinging member and parts carried thereby, and means for retaining the same at adjusted positions, the said mechanisms being mounted upon, and the endwise thrust of the transmission devices sustained by the motor-supporting frame extension.

5. In a transmission mechanism for motor-vehicles or the like, the combination with the engine shaft, and the propeller shaft; of a frictional element fixed to the engine shaft and having a spherically concave contact face, a tubular bearing sleeve transversely fulcrumed to swing up and down at its forward end, a hollow shaft rotatably supported within said sleeve and having its rear end coupled by universal joint to said propeller shaft, a counter frictional element having an annular convex contact face and a projecting axle that is supported and endwise movable within said hollow shaft, an expanding tensional spring within the hollow shaft acting against said axle, and means for adjusting and retaining said bearing-sleeve at different positions of adjustment.

6. A mechanism of the class described, comprising in combination with the motor shaft, a drive-disk or member fixed upon said shaft and having an approximately spherically concave friction face, an oppositely disposed disk having an annular rim face of similar convex contour to receive motion from said drive-disk, a telescoping axial support for said second disk, a bearing support therefor fulcrumed transversely to its axle in a plane coincident with the plane of the motor-shaft axis, and at a position where the axis line extended intersects approximately coincident with the center point of the circular arc of the frictional faces, means for adjusting said bearing support and retaining it as adjusted, and means for moving said second disk toward and from the first.

7. In a transmission mechanism for automobiles or the like, in combination substantially as described, with the motor shaft and propeller-shaft, a concave faced frictional disk fixed upon the motor-shaft, a counter frictional element having a convex contact face, its axle telescopingly connected with an intermediate shaft having its rear end coupled by universal joint to said propeller-shaft, a bearing-sleeve or element within which said intermediate shaft is supported, upright guides between which said bearing element is arranged, its rear end transversely pivoted upon the supporting frame on a line approximately coincident with the center of said universal joint and at the center of a circular arc represented by the curvature of the concave friction-face, a hand-lever attached to said bearing-sleeve, a latch and notched segment for locking said bearing member at positions of adjustment, a latch controlling means connected with said hand-lever, a pedal and suitable connections for releasing the contact of the frictional surfaces, and a spring for pressing the frictional members together.

8. In a transmission mechanism for motor vehicles or the like, the combination with the motor-driven shaft and propeller shaft; of a frictional-clutch mechanism comprising a concave driving member and an annular convex driven member, said driven member having its shaft coupled by a universal joint with the propeller shaft, means for varying the axial alinement and contact relation of the clutch members in respect to each other, and a brake device adjacent to and shifting with the variation in axial alinement of said driven clutch member, and adapted for contact therewith of said member when the same is retracted.

9. In a transmission mechanism, in combination, a driving friction-disk, and a friction-member that receives motion therefrom and is adapted for varied adjustment in connection therewith; a shaft for said driven friction member, a swinging bearing-sleeve supporting the shaft of said driven friction-member, and having its rear end pivotally supported, a brake means carried upon said bearing-sleeve and adapted for contact with, and for resisting the rotation of said driven friction-member after the frictional faces are separated, means for swinging said sleeve to vary the axial relation of the driven friction-member in respect to the driving friction-disk, and a controlling means for throwing the friction clutch into and out of operation.

10. In a transmission mechanism of the character described, the combination, with the motor shaft, and the propeller shaft, a concave-faced friction clutch member carried upon the motor shaft, and the convex-faced friction driven clutch member mounted to convey motion to the propeller shaft, and to move into and from contact with said first named friction clutch member; of a swinging bearing means, a shaft for said driven clutch member supported thereby, said bearing means provided with forwardly projecting arms having brake-shoes mounted thereon and positioned to contact with the back of said driven clutch member when the frictional faces are separated by retraction of said driven clutch member, and a pedal connected means for moving said clutch members into and from engaging relation.

11. A transmission mechanism of the character described, including a pair of axially variable frictional clutch members, the driven member having an annular back surface, and means for closing together and separating the friction clutch surfaces; a sleeve supporting the axis of the driven member, said sleeve provided with arms having laterally projecting pins or studs, removable brake members having sockets adapted to readily slip onto and from said pins, and releasable fastening devices for retaining said brake members at adjusted position upon said pins.

12. A variable transmission mechanism, including a motor-shaft a concave-faced friction clutch member thereon, an inclined propeller shaft, a counter clutch member a transmission shaft carrying the latter and connected by a universal joint with said propeller-shaft, a hinged bearing-member supporting said transmission shaft and movable to swing up and down between guiding housings, said swinging parts being located and relatively arranged to cause the transmission shaft to more nearly assume straight alinement with the propeller shaft as the counter clutch member is shifted upward from its normal speed position, or downward from its extreme reverse position, substantially as set forth.

Witness my hand this 16th day of June, 1913.

FRANK O. WOODLAND.

Witnesses:
C. S. PUTNAM,
CHAS. H. BURLEIGH.